United States Patent
Kim et al.

(10) Patent No.: US 10,969,850 B2
(45) Date of Patent: *Apr. 6, 2021

(54) METHOD FOR TRANSMITTING AND RECEIVING WAKE-UP SIGNAL IN VEHICLE NETWORK

(71) Applicants: Hyundai Motor Company, Seoul (KR); Kia Motors Corporation, Seoul (KR)

(72) Inventors: Dong Ok Kim, Gyeonggi-Do (KR); Kang Woon Seo, Seoul (KR); Jin Hwa Yun, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/924,755

(22) Filed: Jul. 9, 2020

(65) Prior Publication Data
US 2020/0341534 A1    Oct. 29, 2020

Related U.S. Application Data

(63) Continuation of application No. 15/879,864, filed on Jan. 25, 2018, now Pat. No. 10,754,411.

(30) Foreign Application Priority Data

May 30, 2017 (KR) .......................... 10-2017-0066507

(51) Int. Cl.
*G06F 1/3209* (2019.01)
*H04W 52/02* (2009.01)
*H04L 29/08* (2006.01)
*H04L 12/12* (2006.01)
*H04L 12/40* (2006.01)

(52) U.S. Cl.
CPC ............ *G06F 1/3209* (2013.01); *H04L 12/40* (2013.01); *H04L 67/12* (2013.01); *H04L 69/323* (2013.01); *H04W 52/0235* (2013.01); *H04L 12/12* (2013.01); *H04L 2012/40273* (2013.01); *Y02D 30/50* (2020.08); *Y02D 30/70* (2020.08)

(58) Field of Classification Search
CPC ......... Y02D 30/50; H04L 2012/40267–40273; G06F 1/32–3296
See application file for complete search history.

(56) References Cited

U.S. PATENT DOCUMENTS

| | | |
|---|---|---|
| 2010/0293404 A1* | 11/2010 | Diab ...................... G06F 1/3209 713/324 |
| 2011/0022699 A1 | 1/2011 | Powell et al. |
| 2011/0194471 A1 | 8/2011 | Kim et al. |
| 2013/0111074 A1 | 5/2013 | Blaschke et al. |
| 2013/0318380 A1 | 11/2013 | Behrens et al. |
| 2014/0081518 A1 | 3/2014 | Son |

(Continued)

*Primary Examiner* — Marcus Smith
(74) *Attorney, Agent, or Firm* — Mintz Levin Cohn Ferris Glovsky and Popeo, P.C.; Peter F. Corless

(57) ABSTRACT

An operation method of a communication node in a vehicle network may include detecting a local event; transitioning an operation mode of the communication node from a sleep mode to a normal mode when the local event is detected; generating a wake-up signal including a wake-up pattern corresponding to the local event; and transmitting the wake-up signal.

13 Claims, 8 Drawing Sheets

(56) References Cited

U.S. PATENT DOCUMENTS

| | | |
|---|---|---|
| 2014/0223164 A1* | 8/2014 | Jiang .................. H04L 12/12 |
| | | 713/100 |
| 2014/0245049 A1 | 8/2014 | Matsushita |
| 2016/0065409 A1 | 3/2016 | Kim et al. |
| 2016/0132098 A1* | 5/2016 | Chen .................. G06F 1/3296 |
| | | 713/323 |
| 2016/0132455 A1 | 5/2016 | Ho et al. |
| 2017/0031421 A1 | 2/2017 | Chaplin et al. |
| 2017/0250836 A1 | 8/2017 | Wang |
| 2017/0318612 A1 | 11/2017 | Gu et al. |
| 2018/0262865 A1 | 9/2018 | Lepp et al. |
| 2019/0103988 A1* | 4/2019 | Martin .............. H04L 12/40013 |

\* cited by examiner

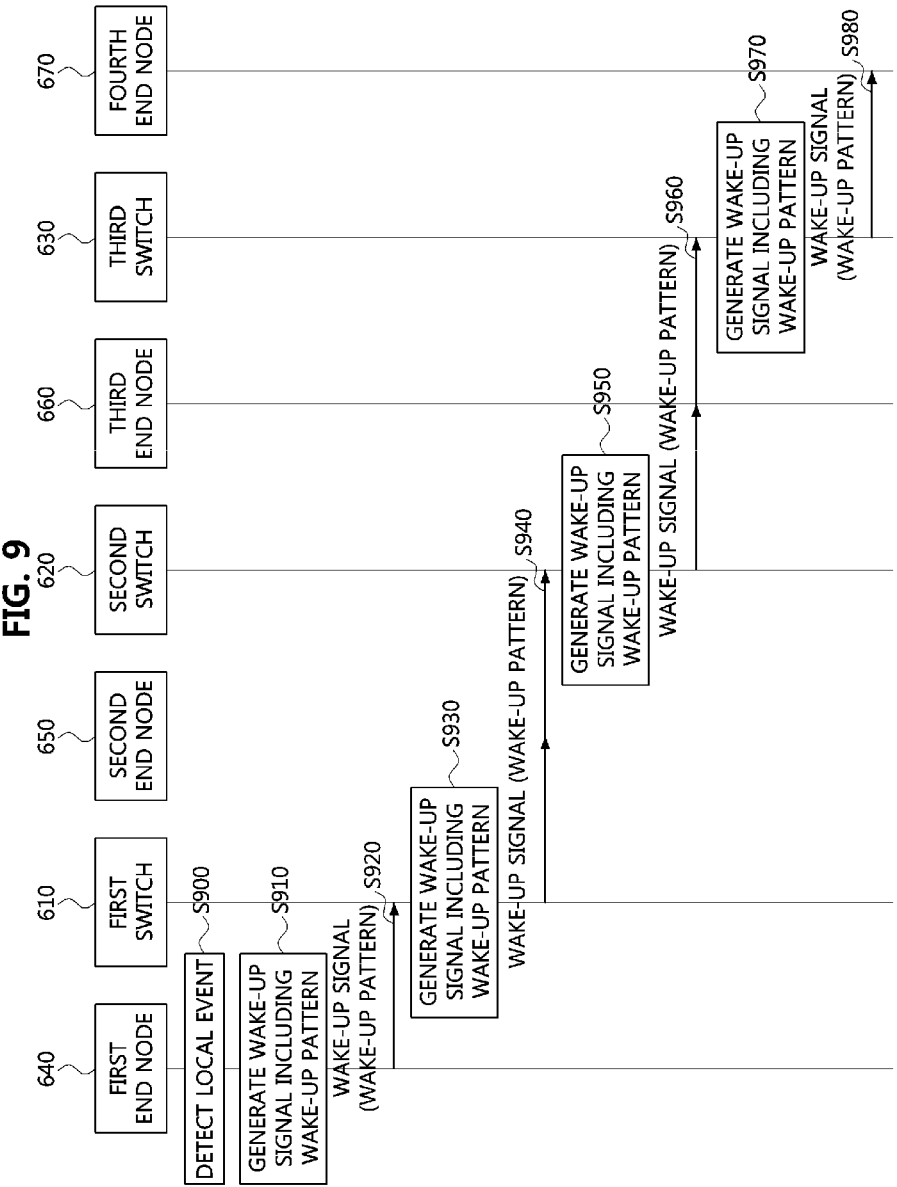

METHOD FOR TRANSMITTING AND RECEIVING WAKE-UP SIGNAL IN VEHICLE NETWORK

CROSS-REFERENCE TO RELATED APPLICATION

This application is a Continuation Application of U.S. application Ser. No. 15/879,864, filed on Jan. 25, 2018, which claims the benefit of priority to Korean Patent Application No. 10-2017-0066507, filed on May 30, 2017 in the Korean Intellectual Property Office (KIPO), the entirety of which is incorporated by reference as if fully set forth herein.

TECHNICAL FIELD

The present disclosure relates generally to a vehicle network technology, and more specifically, to a method for transmitting and receiving a wake-up signal indicating a wake-up reason.

BACKGROUND

The number and variety of devices installed in vehicles have increased significantly in accordance with the recent digitalization of vehicle parts. Generally, electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via a vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Most enhanced safety systems of a vehicle, such as telematics systems and infotainment systems, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

The vehicle network described above may include a plurality of communication nodes (e.g., electronic devices), and a first communication node may transmit a wake-up signal to a second communication node when a specific event is detected. Upon receiving the wake-up signal, an operation mode of the second communication node may transition from a sleep mode to a normal mode. Thereafter, the second communication node may perform operations according to a wake-up reason if the second communication node is aware of the wake-up reason. However, the second communication node may not be aware of the wake-up reason even if it is woken up, so that operations according to the wake-up reason may not be properly performed. For example, in case that information indicating a wake-up reason is transmitted via a separate message (e.g., an application message, a network management (NM) message, etc.), the second communication node may not identify the wake-up reason until it receives the separate message including the information.

SUMMARY

The present disclosure provides a method of transmitting and receiving a wake-up signal including information indicating a wake-up reason in a vehicle network.

In accordance with embodiments of the present disclosure, an operation method of a communication node in a vehicle network includes: detecting a local event; transitioning an operation mode of the communication node from a sleep mode to a normal mode when the local event is detected; generating a wake-up signal including a wake-up pattern corresponding to the local event; and transmitting the wake-up signal.

The local event may indicate at least one wake-up reason of the communication node, and the wake-up pattern may be configured for each of the at least one wake-up reason.

The at least one wake-up reason may include at least one of: a door operation, a telematics operation, a media operation, a power mode transition of a vehicle, a theft detection, and a reserved operation.

When the communication node is an end node in the vehicle network, the wake-up signal may be transmitted in a broadcast manner to at least one switch connected to the communication node.

The communication node may include a controller and a physical (PHY) layer, and the local event may be detected by the controller.

The transitioning of the operation mode may further include transitioning an operation mode of the controller from the sleep mode to the normal mode; transmitting, by the controller, a transition request signal instructing a transition from the sleep mode to the normal mode to the PHY layer; and upon receiving the transition request signal, transitioning an operation of the PHY layer from the sleep mode to the normal mode.

The transition request signal may be transmitted to the PHY layer via an enable (EN) pin of the controller.

The generating of the wake-up signal may further include generating, by the controller, the wake-up pattern corresponding to the local event; transmitting, by the controller, the wake-up pattern to the PHY layer; and generating, by the PHY layer, the wake-up signal including the wake-up pattern.

The wake-up pattern may be transmitted to the PHY layer through a management data input/output (MDIO) interface or a media independent interface (xMII) between the controller and the PHY layer.

Further, in accordance with embodiments of the present disclosure, an operation method of a first communication node in a vehicle network includes: receiving, from a second communication node, a first wake-up signal including a wake-up pattern indicating at least one wake-up reason; transitioning an operation mode of the first communication node from a sleep mode to a normal mode when the first wake-up signal is received; generating a second wake-up signal including the wake-up pattern; and transmitting the second wake-up signal.

The at least one wake-up pattern may indicate the wake-up reason of the second communication node, and the wake-up pattern may be configured for each of the at least one wake-up reason.

The at least one wake-up reason may include at least one of: a door operation, a telematics operation, a media operation, a power mode transition of a vehicle, a theft detection, and a reserved operation.

When the first communication node is a switch and the second communication node is an end node connected to the switch in the vehicle network, the second wake-up signal may be transmitted in a broadcast manner to at least one other communication node connected to the switch.

The first communication node may include a controller, a first physical (PHY) layer, and a second PHY layer, and the first wake-up signal may be received at the first PHY layer.

The transitioning of the operation mode may further include transitioning an operation mode of the first PHY layer receiving the first wake-up signal from the sleep mode to the normal mode; transmitting, by the first PHY layer, a first transition request signal instructing a transition from the sleep mode to the normal mode to the controller; upon receiving the first transition request signal, transitioning an operation mode of the controller from the sleep mode to the normal mode; transmitting, by the controller, a second transition request signal instructing a transition from the sleep mode to the normal mode to the second PHY layer; and upon receiving the second transition request signal, transitioning an operation mode of the second PHY layer from the sleep mode to the normal mode.

The first transition request signal may be transmitted to the controller via an interrupt pin of the first PHY layer, and the second transition request signal may be transmitted to the second PHY layer via an enable (EN) pin of the controller.

The generating of the second wake-up signal may further include transmitting, by the first PHY layer, the first wake-up signal or the wake-up pattern included in the first wake-up signal to the controller; transmitting, by the controller, the wake-up pattern obtained from the first PHY layer to the second PHY layer; and generating, by the second PHY layer, the second wake-up signal including the wake-up pattern received from the controller.

The first wake-up signal or the wake-up pattern included in the first wake-up signal may be transmitted from the first PHY layer to the controller through a management data input/output (MDIO) interface or a media independent interface (xMII) between the first PHY layer and the controller.

The wake-up pattern may be transmitted from the controller to the second PHY layer through a management data input/output (MDIO) interface or a media independent interface (xMII) between the controller and the second PHY layer.

The second wake-up signal may be configured to be identical to the first wake-up signal, and the second wake-up signal may be transmitted by the second PHY layer.

According to embodiments of the present disclosure, in the vehicle network, the first communication node can generate a wake-up signal including information indicating a wake-up reason (e.g., a wake-up pattern), and can transmit the generated wake-up signal. Thus, the first communication node may notify its wake-up reason to other communication nodes using the wake-up signal without transmitting a separate message such as an application message or a network management (NM) message. On the other hand, upon receiving the wake-up signal, the second communication node can identify the wake-up reason based on the received wake-up signal, and can operate based on the identified wake-up reason. Therefore, the wake-up reason can be shared among the communication nodes, so that malfunction of the communication nodes can be prevented. As a result, the performance of the vehicle network can be improved.

BRIEF DESCRIPTION OF DRAWINGS

Embodiments of the present disclosure will become more apparent by describing in detail forms of the present disclosure with reference to the accompanying drawings, in which:

FIG. 9 is a flowchart for explaining a second embodiment of an operation method of a communication node in the vehicle network shown in FIG. 6.

Figure 1:
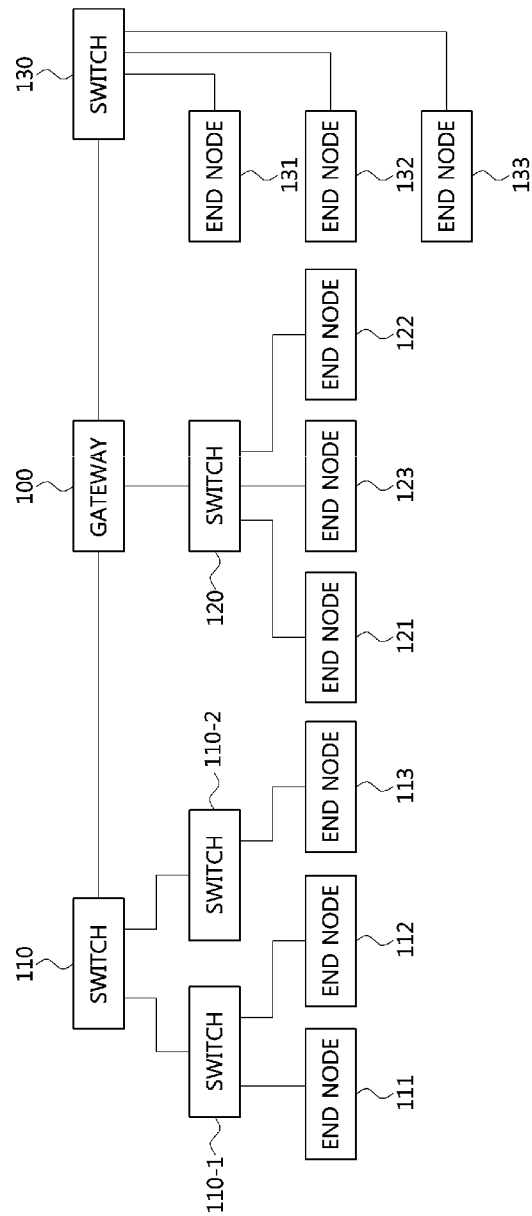
FIG. 1 is a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. To facilitate the entire understanding of the disclosure, like numbers refer to like elements throughout the description of the figures and the repetitive description thereof will be omitted.

Referring now to the presently disclosed embodiments, FIG. 1 is a block diagram illustrating a first embodiment of a vehicle network topology.

As shown in FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. Embodiments according to the present disclosure may be applied to the network topologies described above, and the network topology to which the embodiments according to the present disclosure are applied is not limited to these, and may be variously configured.

Figure 2:
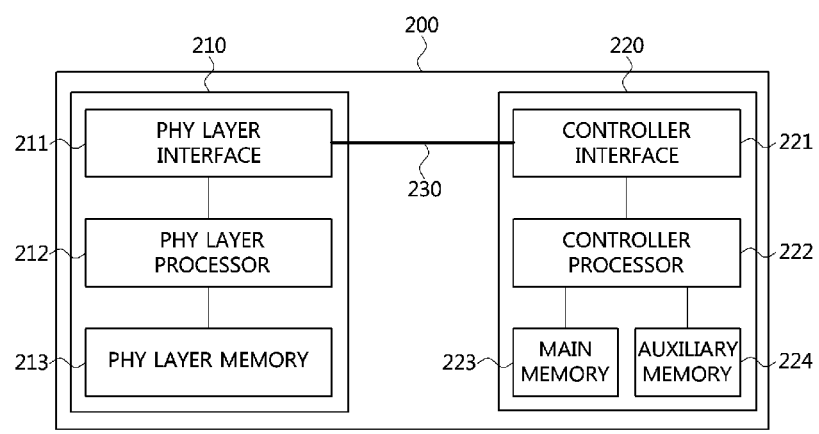
FIG. 2 is a block diagram illustrating a first embodiment of a communication node belonging to a vehicle network.

FIG. 2 is a block diagram illustrating a first embodiment of a communication node belonging to a vehicle network.

As shown in FIG. 2, a communication node 200 constituting a vehicle network illustrated in, e.g., FIG. 1, may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Meanwhile, the PHY layer 210 (i.e., the PHY layer processor 212) may be in a sleep mode, a normal mode (e.g., an active mode), or the like. The PHY layer 210 may transition from the sleep mode to the normal mode and transition from the normal mode to the sleep mode based on the control of the controller processor 222. The controller 220 (i.e., the controller processor 222) may be in a power-off mode, a sleep mode, a normal mode, or the like. The controller 220 may transition from the power-off mode to the sleep mode or the normal mode, transition from the sleep mode to the power-off mode or the normal mode, and transition from the normal mode to the power-off mode or to the sleep mode.

Here, the power-off mode may mean a state in which power is not supplied to the corresponding entity (e.g., the controller 220, etc.). The sleep mode may mean a state (i.e., a power saving state) in which a minimum amount of power is supplied to the corresponding entity (e.g., the PHY layer 210, the controller 220, etc.) for basic operation. The normal mode may mean a state (i.e., wake-up state) in which power is normally supplied to the corresponding entity (e.g., PHY layer 210, controller 220, etc.).

Meanwhile, the communication node 200 illustrated in FIG. 2 may be configured as follows.

Figure 3:
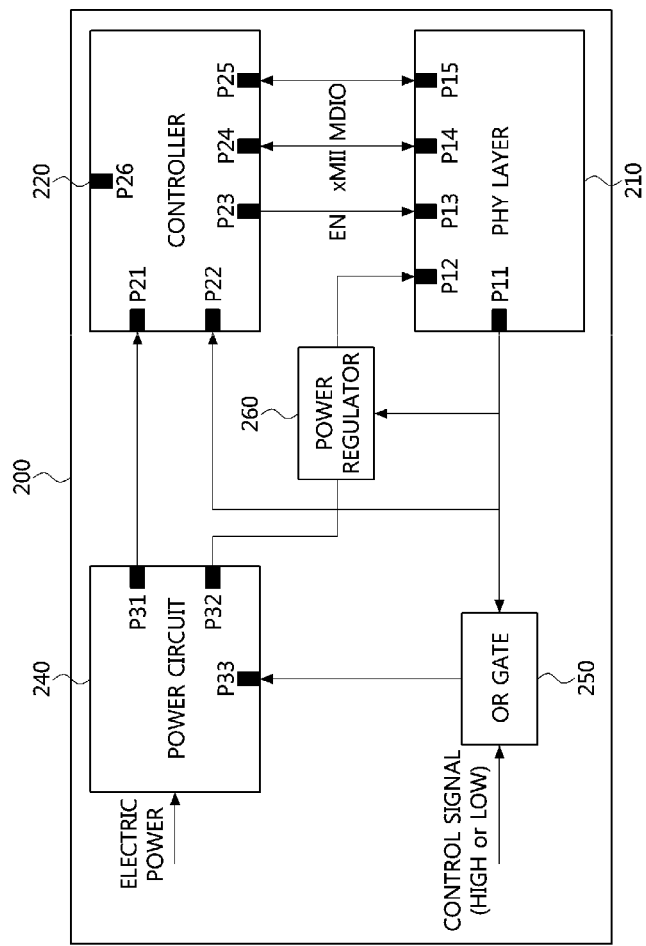
FIG. 3 is a block diagram illustrating a second embodiment of a communication node belonging to a vehicle network.

FIG. 3 is a block diagram illustrating a second embodiment of a communication node belonging to a vehicle network.

As shown in FIG. 3, the communication node 200 may comprise the PHY layer 210, the controller 220, a power circuit 240, an OR gate 250, a power regulator 260, and the like. Each of the PHY layer 210 and the controller 220 shown in FIG. 3 may be the same as or similar to the PHY layer 210 and the controller 220 shown in FIG. 2.

The PHY layer 210 may include a plurality of pins (e.g., P11, P12, P13, P14, and P15). The PHY layer 210 may output a signal for instructing power supply, a signal for instructing power-off, etc. through P11. For example, a HIGH signal output through P11 of the PHY layer 210 may indicate the power supply, and a LOW signal output through P11 of the PHY layer 210 may indicate the power-off. The P11 of the PHY layer 210 may denote an inhibit (INH) pin.

Alternatively, the PHY layer 210 may output an interrupt signal via P11. For example, a HIGH signal output through P11 of the PHY layer 210 may mean an interrupt signal, and the interrupt signal may be received at P22 of the controller

220. The interrupt signal may instruct transition from the sleep mode to the normal mode. Here, the P11 may denote an interrupt pin.

Electric power may be supplied from the power circuit 240 through P12 of the PHY layer 210. The PHY layer 210 may receive a signal instructing a transition from the sleep mode to the normal mode, a signal instructing a transition from the normal mode to the sleep mode, and the like via P13. For example, a HIGH signal input through P13 of the PHY layer 210 may instruct the transition from the sleep mode to the normal mode, and a LOW signal input through P13 of the PHY layer 210 may instruct the transition from the normal mode to the sleep mode. The P13 of the PHY layer 210 may denote an enable (EN) pin.

The P14 of PHY layer 210 may be used for xMII and the P15 of PHY layer 210 may be used for a management data input/output (MDIO) interface. For example, the PHY layer 210 may transmit and receive signals (e.g., Ethernet related signals) with the controller 220 using P14 and P15. The setting of each of the plurality of pins included in the PHY layer 210 is not limited to that described above, and each of the plurality of pins included in the PHY layer 210 may be variously configured.

The controller 220 may include a plurality of pins (e.g., P21, P22, P23, P24, P25, and P26). Electric power may be supplied from the power circuit 240 via P21 of the controller 220. The controller 220 may receive an interrupt signal via P22. For example, a HIGH signal input through P22 of the controller 220 may mean an interrupt signal. The controller 220 may transition from the sleep mode to the normal mode upon receiving the interrupt signal. The P22 of the controller 220 may denote an interrupt pin.

The controller 220 may output a signal instructing a transition from the sleep mode to the normal mode, a signal instructing a transition from the normal mode to the sleep mode, and the like via P23. For example, a HIGH signal output through P23 of the controller 220 may instruct the transition from the sleep mode to the normal mode, and a LOW signal output through the P23 of the controller 220 may instruct the transition from the normal mode to the sleep mode. The P23 of the controller 220 may denote the EN pin.

The P24 of the controller 220 may be used for xMII and the P25 of the controller 220 may be used for the MDIO interface. For example, the controller 220 may transmit and receive signals (e.g., Ethernet related signals) with the PHY layer 210 using P24 and P25. The controller 220 may detect a local wake-up signal (e.g., a local event) via P26. For example, a HGH signal input through P26 of the controller 220 may indicate a local wake-up signal. The P26 of the controller 220 may denote a WAKE pin. The setting of each of the plurality of pins included in the controller 220 is not limited to that described above, and each of the plurality of pins included in the controller 220 may be variously configured.

The power circuit 240 may include a plurality of pins (e.g., P31, P32, and P33). The power circuit 240 may receive a signal for instructing power supply, a signal for instructing power-off, and the like through P33. For example, a HIGH signal input via P33 of the power circuit 240 may indicate the power supply, and a LOW signal input from P33 of the power circuit 240 may indicate the power-off. The power circuit 240 may supply power based on the signal input through P33. For example, the power circuit 240 may supply power to the controller 220 via P31 and power to the PHY layer 210 via P32. The setting of each of the plurality of pins included in the power circuit 240 is not limited to that described above, and each of the plurality of pins included in the power circuit 240 may be variously configured.

The OR gate 250 may receive a control signal (e.g., a HIGH signal or a LOW signal) from an arbitrary entity (e.g., the controller 220), and a control signal (e.g., a HIGH signal or a LOW signal) from the PHY layer 210. The OR gate 250 may perform an OR operation on the control signals received from the arbitrary entity and the PHY layer 210, and may output a result of the OR operation. The result of the OR operation may be input to P33 of the power circuit 240.

An input end of the power regulator 260 may be connected to P32 of the power circuit 240 and an output end of the power regulator 260 may be connected to P12 of the PHY layer 210. When a voltage of the power supplied from the power circuit 240 exceeds a predetermined threshold value (e.g., 3.3 V), the power regulator 260 may regulate the voltage of the supplied power to the predetermined threshold value or less, and supply power having the regulated voltage to the PHY layer 210.

Meanwhile, a protocol structure of the communication node shown in FIG. 1 to FIG. 3 may be as follows.

Figure 4:
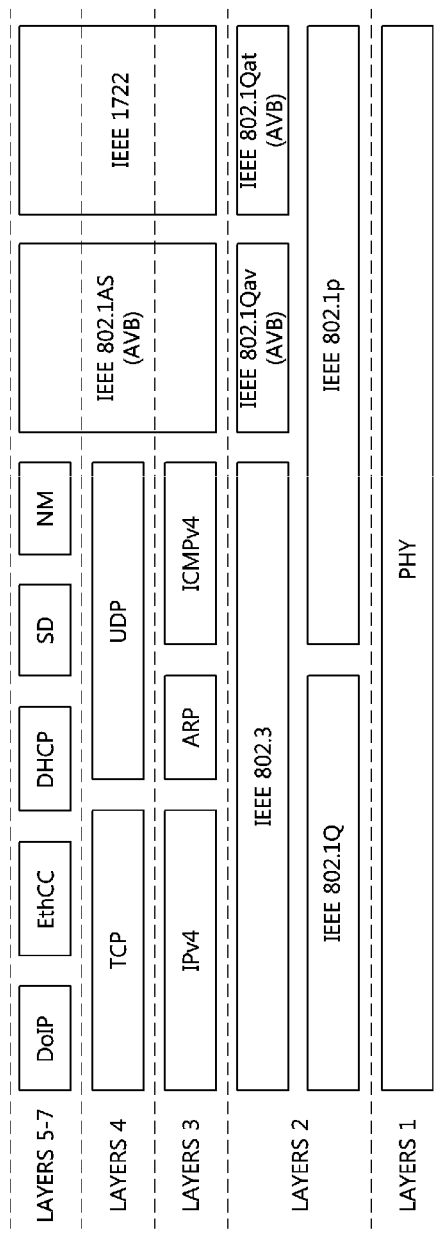
FIG. 4 is a block diagram illustrating a first embodiment of a protocol structure of a communication node constituting a vehicle network.

FIG. 4 is a block diagram illustrating a first embodiment of a protocol structure of a communication node constituting a vehicle network.

As shown in FIG. 4, a communication node may comprise layer 1 through layer 7. The layer 1 of the communication node may support the PHY functions and support a transmission rate of 100 megabits per second (Mbps). The layer 2 of the communication node may support IEEE 802.1Q protocol, IEEE 802.1p protocol, IEEE 802.3 protocol, audio video bridging (AVB) protocol (e.g., IEEE 802.1Qav protocol, IEEE 802.1Qat protocol), and the like. The layer 3 of the communication node may support internet protocol version 4 (IPv4), address resolution protocol (ARP), internet control message protocol version 4 (ICMPv4), IEEE 802.1AS, IEEE 1722, and the like. The layer 4 of the communication node may support transfer control protocol (TCP), user datagram protocol (UDP), IEEE 802.1AS, IEEE 1722, and the like. The layers 5 through 7 of the communication node may support diagnostics over internet protocol (DoIP), EthCC protocol, dynamic host configuration protocol (DHCP), SD protocol, network management (NM) protocol, IEEE 802.1AS, IEEE 1722, and the like.

The communication node described above may operate in a sleep mode or a normal mode. In the sleep mode, the PHY layer of the communication node may be in an enabled state, and the controller of the communication node may be in a disabled state. Alternatively, in the sleep mode, the PHY layer and the controller of the communication node may be in the disabled state. In the normal mode, the PHY layer and the controller of the communication node may be enabled. That is, the normal mode may indicate a state in which the communication node has waked up. When a wake-up signal is received or when a specific event is detected, the operation mode of the communication node may transition from the sleep mode to the normal mode. In this case, a system booting procedure of the communication node may be performed as follows.

Figure 5:
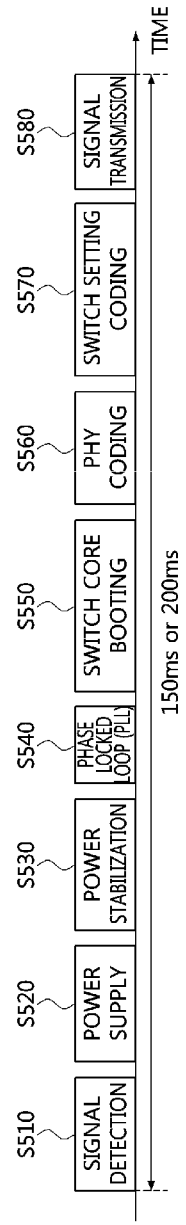
FIG. 5 is a conceptual diagram for explaining a first embodiment of a system booting procedure performed at a communication node.

FIG. 5 is a conceptual diagram for explaining a first embodiment of a system booting procedure performed at a communication node;

As shown in FIG. 5, the system booting procedure may be performed at a switch (or, an end node or a gateway), and may include a signal detection step S510, a power supply step S520, a power stabilization step S530, a phase locked loop (PLL) step S540, a switch core booting step S550, a PHY coding step S560, a switch setting coding step S570, a signal transmission step S580, and the like. For example, in the step S510, when a wake-up signal is received from another communication node (e.g., an end node) or when a specific event is detected, power may be supplied to the switch, and the controller (e.g., core) of the switch may be enabled. Thereafter, the switch may transmit signals over the PHY link after performing a coding procedure (e.g., the steps S550, S560, and S570).

The system booting procedure described above may be completed within a maximum of 150 milliseconds when the switch (or, an end node or a gateway) is the communication node shown in FIG. 2 (i.e., the case that the PHY layer is located inside the switch). On the other hand, the system booting procedure may be completed within a maximum of 200 ms when the switch (or, an end node or a gateway) is the communication node shown in FIG. 3 (i.e., the case that the PHY layer is located outside the switch).

Hereinafter, the operation methods of the communication node supporting the NM functions in the vehicle network will be described. Even when a method (e.g., transmission or reception of a signal) to be performed at the first communication node is described, the corresponding second communication node may perform a method (e.g., reception or transmission of the signal) corresponding to the method performed at the first communication node. That is, when the operation of the first communication node is described, the corresponding second communication node may perform an operation corresponding to the operation of the first communication node. Conversely, when the operation of the second communication node is described, the corresponding first communication node may perform an operation corresponding to the operation of the second communication node.

Figure 6:
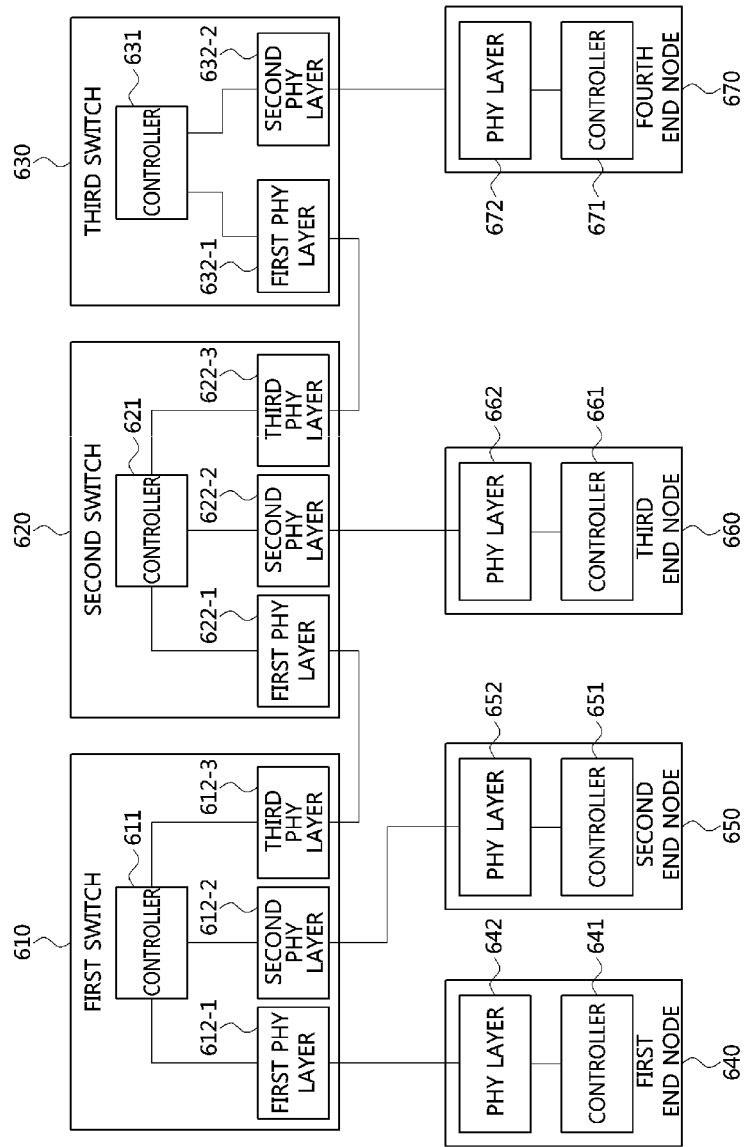
FIG. 6 is a block diagram illustrating a second embodiment of a vehicle network topology.
Figure 7:
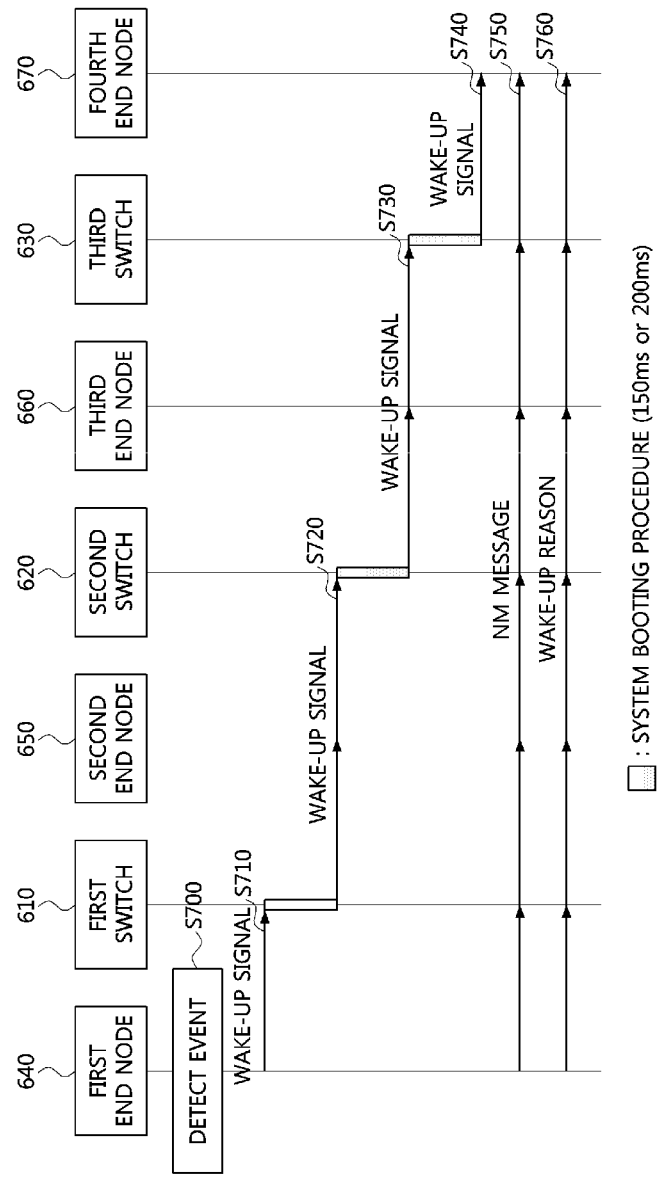
FIG. 7 is a flowchart for explaining a first embodiment of an operation method of a communication node in the vehicle network shown in FIG. 6.

FIG. 6 is a block diagram illustrating a second embodiment of a vehicle network topology, and FIG. 7 is a flowchart for explaining a first embodiment of an operation method of a communication node in the vehicle network shown in FIG. 6.

As shown in FIGS. 6 and 7, a vehicle network may include a first switch 610, a second switch 620, a third switch 630, a first end node 640, a second end node 650, a third end node 660, a fourth end node 670, and the like. The switches 610, 620 and 630 may perform the same or similar functions as the switches shown in FIG. 1, and the end nodes 640, 650, 660 and 670 may perform the same or similar functions as the end node shown in FIG. 1. Each of the switches 610, 620, and 630 and the end nodes 640, 650, 660, and 670 may be configured to be the same as or similar to the communication node shown in FIGS. 2 to 4.

For example, the first switch 610 may include a controller 611, a first PHY layer 612-1, a second PHY layer 612-2, and a third PHY layer 612-3, and each of the controller 611 and the PHY layers 612-1, 612-2, and 612-3 included in the first switch 610 may be the same as or similar to the controller 220 or the PHY layer 210 described with reference to FIGS. 2 and 3. The second switch 620 may include a controller 621, a first PHY layer 622-1, a second PHY layer 622-2, and a third PHY layer 622-3, and each of the controller 621 and the PHY layers 622-1, 622-2, and 622-3 included in the second switch 620 may be the same as or similar to the controller 220 or the PHY layer 210 described with reference to FIGS. 2 and 3. The third switch 630 may include a controller 631, a first PHY layer 632-1, and a second PHY layer 632-2, and each of the controller 631 and the PHY layers 632-1 and 632-2 included in the third switch 630 may be the same as or similar to the controller 220 or the PHY layer 210 described with reference to FIGS. 2 and 3. Each of the end nodes 640, 650, 660 and 670 may include controllers 641, 651, 661, or 671, and PHY layers 642, 652, 662, or 672. Each of the controllers 641, 651, 661 and 671 and the PHY layers 642, 652, 662 and 672 included in the end nodes 640, 650, 660 and 670 may be the same as or similar to the controller 220 or the PHY layer 210 described with reference to FIGS. 2 and 3.

The first switch 610 may be connected to the first end node 640 (e.g., the PHY layer 642 of the first end node 640) via the first PHY layer 612-1, connected to the second end node 650 (e.g., the PHY layer 652 of the second end node 650) via the second PHY layer 612-2, and connected to the second switch 620 (e.g., the first PHY layer 622-1 of the second switch 620) via the third PHY layer 612-3. The communications between the first switch 610 and the second switch 620 may be performed using one interface among MII, RMII, RGMII, SGMII, and XGMII. The second switch 620 may be connected to the first switch 610 (e.g., the third PHY layer 612-3 of the first switch 610) via the first PHY layer 622-1, connected to the third end node 660 (e.g., the PHY layer 662 of the third end node 660) via the second PHY layer 622-2, and connected to the third switch 630 (e.g., the first PHY layer 632-1 of the third switch 630) via the third PHY layer 622-3. The communications between the second switch 620 and the third switch 630 may be performed using one interface among MII, RMII, RGMII, SGMII, and XGMII. The third switch 630 may be connected to the second switch 620 (e.g., the third PHY layer 622-3 of the second switch 620) via the first PHY layer 632-1, and connected to the fourth end node 670 (e.g., the PHY layer 672 of the fourth end node 670) via the second PHY layer 632-2.

Meanwhile, the first end node 640 may operate in the sleep mode and may detect an event (e.g., a local event) (S700). If an event is detected, the first end node 640 may perform a system booting procedure (e.g., the system booting procedure illustrated in FIG. 5, or a system booting procedure based on the CAN protocol or a general-purpose input/output (GPIO)). Accordingly, the operation mode of the first end node 640 may transition from the sleep mode to the normal mode. That is, the first end node 640 may be woken up. Thereafter, the first end node 640 may transmit a wake-up signal (S710). For example, the first end node 640 may identify a wake-up reason (e.g., an occurrence reason of the event). If the first end node 640 determines that it is necessary to wake up another communication node according to the wake-up reason, the first end node 640 may transmit the wake-up signal. Alternatively, the first end node 640 may simultaneously perform the system booting procedure and the wake-up signal transmission procedure. The wake-up signal may be transmitted in a broadcast manner.

Also, the first end node 640 may transmit a message indicating the wake-up reason (e.g., the occurrence reason of the event). However, in case that the message indicating the wake-up reason is transmitted before another communication node (e.g., the first switch 610, the second switch 620, the third switch 630, the second end node 650, the third end node 660, or the fourth end node 670) is woken up, the message indicating the wake-up reason may not be received at the another communication node, and thus the another communication node may not know why itself is woken up. Thus, the message indicating the wake-up reason may be transmitted after all of the communication nodes constituting the vehicle network have been woken up. That is, a transmission time point of the message indicating the wake-up reason may be determined based on the configuration of the vehicle network. For example, the wake-up reason may include, but is not limited to:

Door operation (e.g., door open, door closed);
Telematics operation (e.g., remote start);
Media operation;
Power mode transition of the vehicle (e.g., ACC, IGN);
Detection of theft; and
Reserved operation (e.g., charging operation, software update operation, etc.).

The first switch 610 may receive the wake-up signal from the first end node 640 via the first PHY layer 612-1, and may perform a system booting procedure (i.e., the system booting procedure illustrated in FIG. 5) based on the wake-up signal by operating in the normal mode. A time up to 150 ms or 200 ms may be required to perform the system booting procedure. Thereafter, the first switch 610 may also transmit a wake-up signal (S720). The wake-up signal may be transmitted in a broadcast manner. For example, the wake-up signal may be transmitted through the second PHY layer 612-2 and the third PHY layer 612-3 of the first switch 610.

The second end node 650 may receive the wake-up signal from the first switch 610 via the PHY layer 652, and may perform a system booting procedure (i.e., the system boot procedure illustrated in FIG. 5) based on the wake-up signal. The second switch 620 may receive the wake-up signal from the first switch 610 via the first PHY layer 622-1, and may perform a system booting procedure (i.e., the system booting procedure illustrated in FIG. 5) based on the wake-up signal. A time up to 150 ms or 200 ms may be required to perform the system booting procedure. Thereafter, the second switch 620 may also transmit a wake-up signal (S730). The wake-up signal may be transmitted in a broadcast manner. For example, the wake-up signal may be transmitted through the second PHY layer 622-2 and the third PHY layer 622-3 of the second switch 620.

The third end node 660 may receive the wake-up signal from the second switch 620 via the PHY layer 662, and may perform a system booting procedure (i.e., the system boot procedure illustrated in FIG. 5) based on the wake-up signal. The third switch 630 may receive the wake-up signal from the second switch 620 via the first PHY layer 632-1, and may perform a system booting procedure (i.e., the system booting procedure illustrated in FIG. 5) based on the wake-up signal. A time up to 150 ms or 200 ms may be required to perform the system booting procedure. Thereafter, the third switch 630 may also transmit a wake-up signal (S740). The wake-up signal may be transmitted in a broadcast manner. For example, the wake-up signal may be transmitted through the second PHY layer 632-2 of the third switch 630. The fourth end node 670 may receive the wake-up signal from the third switch 630 via the PHY layer 672, and may perform a system booting procedure (i.e., the system booting procedure illustrated in FIG. 5) based on the wake-up signal by operating in the normal mode.

Meanwhile, the first end node 640 which has been woken up may generate an NM message and transmit the NM message in a broadcast manner (S750). The NM message may be configured as follows.

Figure 8:
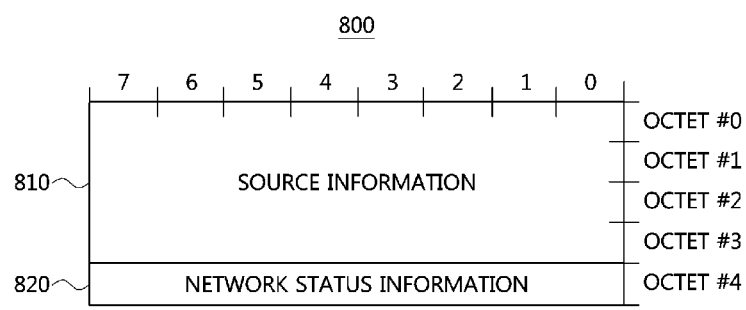
FIG. 8 is a block diagram illustrating a first embodiment of an NM message.

FIG. 8 is a block diagram illustrating a first embodiment of an NM message.

As shown in FIG. 8, an NM message 800 may include a source information field 810 and a network status information field 820. The source information field 810 may include an identifier (e.g., an address) of a source communication node and may have a size of 4 octets. The network status information field 820 may indicate a network status of the communication node that transmitted the NM message 800 and may have a size of 1 octet.

Referring again to FIGS. 6 and 7, the source information field of the NM message transmitted in the step S750 may indicate the identifier of the first end node 640, and the network status information field of the NM message transmitted in the step S750 may indicate the network status of the first end node 640. In the vehicle network, the first switch 610, the second switch 620, the third switch 630, the second end node 650, the third end node 660, and the fourth end node 670 may receive the NM message of the first end node 640, and confirm the network status of the first end node 640 based on the received NM message.

Also, the first end node 640 may generate a message indicating the wake-up reason and may transmit the message (S760). Since the message is transmitted in a broadcast manner, the first switch 610, the second switch 620, the third switch 630, the second end node 650, the third end node 660, and the fourth end node 670 may receive the message indicating the wake-up reason of the first end node 640, and confirm the wake-up reason based on the received message. For example, when the wake-up reason indicates 'door open' and the second end node 650 has a function to be performed for the door open event, the second end node 650 may maintain the normal mode, and perform the function according to the door open event. On the other hand, when the wake-up reason indicates 'door open' and the fourth end node 670 does not have a function to be performed for the door open event, the operation mode of the fourth end node 670 may be transited from the normal mode to the sleep mode again.

In the operation method of the communication node described above, the message indicating the wake-up reason is transmitted separately after the transmission of the wake-up signal, so that the communication node may not be able to confirm the wake-up reason at the receiving step of the wake-up signal. Therefore, the communication node may fail to perform an operation according to the wake up reason. Hereinafter, methods of transmitting and receiving a wake-up signal (e.g., a wake-up pattern) including information indicating a wake-up reason in the vehicle network will be described.

FIG. 9 is a flowchart for explaining a second embodiment of an operation method of a communication node in the vehicle network shown in FIG. 6.

As shown in FIG. 9, a vehicle network may include a first switch 610, a second switch 620, a third switch 630, a first end node 640, a second end node 650, a third end node 660, a fourth end node 670, and the like. The switches 610, 620 and 630 may perform the same or similar functions as the switches shown in FIG. 1, and the end nodes 640, 650, 660 and 670 may perform the same or similar functions as the end node shown in FIG. 1. Each of the switches 610, 620, and 630 and the end nodes 640, 650, 660, and 670 may be configured to be the same as or similar to the communication node shown in FIGS. 2 to 4.

For example, the first switch 610 may include a controller 611, a first PHY layer 612-1, a second PHY layer 612-2, and a third PHY layer 612-3, the second switch 620 may include a controller 621, a first PHY layer 622-1, a second PHY layer 622-2, and a third PHY layer 622-3, and the third switch 630 may include a controller 631, a first PHY layer 632-1, and a second PHY layer 632-2. Each of end nodes 640, 650, 660, and 670 may include a controller 641, 651, 661, or 671, and a PHY layer 642, 652, 662, or 672.

Meanwhile, all the communication nodes constituting the vehicle network may operate in the sleep mode, and a local event (or, a local wake-up signal) may be detected at the first end node 640. For example, the first end node 640 may detect a local event through a P26 of the controller 641 (e.g., the P26 illustrated in FIG. 3) or a power circuit of the first end node 640 (e.g., the power circuit 240 illustrated in FIG. 3) (S900). When a local event is detected, the operation mode of the controller 641 may transition from the sleep mode to the normal mode, and a booting procedure for the controller 641 may be performed. The controller 641 operating in the normal mode may transmit a signal (e.g., a transition request signal) instructing the transition from the sleep mode to the normal mode to the PHY layer 642 via a P23 (e.g., the P23 illustrated in FIG. 3). When the signal instructing the transition from the sleep mode to the normal mode is received via a P13 (e.g., the P13 illustrated in FIG. 3), the operation mode of the PHY layer 642 may transition from the sleep mode to the normal mode, and a booting procedure for the PHY layer 642 may be performed.

Also, the controller 641 operating in the normal mode may generate a wake-up pattern indicating a wake-up reason. The wake-up pattern may be configured for each wake-up reason, and the wake-up pattern may be shared by all the communication nodes constituting the vehicle network. For example, as shown in Table 1 below, 16 wake-up patterns may be configured, and each of the wake-up patterns may indicate a different wake-up reason. Among values corresponding to the wake-up patterns in Table 1, '0' may indicate a LOW signal and '1' may indicate a HIGH signal. Table 1 is an example of the wake-up patterns. The wake-up patterns are not limited to the contents described in Table 1, and the wake-up patterns may be configured in various ways.

TABLE 1

| Wake-up pattern | value | Wake-up reason |
| --- | --- | --- |
| #0 | 0000 | Door operation |
| #1 | 0001 | Telematics operation |
| #2 | 0010 | Media operation |
| #3 | 0011 | Power mode transition |
| #4 | 0100 | Detection of theft |
| #5 | 0101 | Reserved operation |
| #6 | 0110 | Reserved |
| #7 | 0111 | Reserved |
| #8 | 1000 | Reserved |
| #9 | 1001 | Reserved |
| #10 | 1010 | Reserved |
| #11 | 1011 | Reserved |
| #12 | 1100 | Reserved |
| #13 | 1101 | Reserved |
| #14 | 1110 | Reserved |

For example, when the detected wake-up reason corresponds to the local event 'door operation', the controller 641 may generate the wake-up pattern #0. The controller 641 may then transmit the generated wake-up pattern (e.g., the wake-up pattern #0) to the PHY layer 642 through an MDIO interface (e.g., the P25 illustrated in FIG. 3) or an xMII (e.g., the P24 illustrated in FIG. 3). The PHY layer 642 operating in the normal mode may receive the wake-up pattern via the MDIO interface (e.g., the P15 illustrated in FIG. 3) or the xMII (e.g., the P14 illustrated in FIG. 3). The PHY layer 642 may generate a wake-up signal including the wake-up pattern (S910), and may transmit the generated wake-up signal (S920). The wake-up signal of the first end node 640 may be transmitted in a broadcast manner.

The PHY layer 612-1 of the first switch 610 may receive the wake-up signal including the wake-up pattern from the first end node 640. Here, the PHY layer 612-1 may operate as a receiving PHY layer. The wake-up signal including the wake-up pattern may be stored in a memory (e.g., the PHY layer memory 213 illustrated in FIG. 2) of the first PHY layer 612-1. When the wake-up signal of the first end node 640 is received, the booting procedure for the first PHY layer 612-1 may be performed, and the operation mode of the first PHY layer 612-1 may transition from the sleep mode to the normal mode. The first PHY layer 612-1 operating in the normal mode may transmit an interrupt signal to the controller 611 via a P11 (e.g., the P11 illustrated in FIG. 3), thereby causing the controller 611 to wake up. Alternatively, the first PHY layer 612-1 operating in the normal mode may wake up the controller 611 by transmitting a HIGH signal to the OR gate so that power is supplied to the controller 611.

The first PHY layer 612-1 may confirm the wake-up reason based on the wake-up pattern included in the wake-up signal. For example, when the wake-up pattern is the wake-up pattern #0, the first PHY layer 612-1 may determine that the wake-up reason is the door operation event. When the controller 611 operates in the normal mode, the first PHY layer 612-1 may transmit the wake-up signal (or, the wake-up pattern included in the wake-up signal) received from the first end node 640 to the controller 611 through an MDIO interface (e.g., the P15 illustrated in FIG. 3) or an xMII (e.g., the P14 illustrated in FIG. 3).

On the other hand, when the interrupt signal is received from the first PHY layer 612-1 or when power is supplied from the power circuit to the controller 611, a booting procedure for the controller 611 may be performed, and the operation mode of the controller 611 may transition from the sleep mode to the normal mode. The controller 611 operating in the normal mode may receive the wake-up signal (or, the wake-up pattern included in the wake-up signal) via the MDIO interface (e.g., the P25 shown in FIG. 3) or the xMII (e.g., the P24 illustrated in FIG. 3), and may identify the wake-up reason (e.g., one of the wake-up reasons in Table 1) based on the received wake-up pattern. The wake-up signal (or, the wake-up pattern included in the wake-up signal) may be stored in a memory of the controller 611 (e.g., the main memory 223 or the auxiliary memory 224 of FIG. 2).

The controller 611 operating in the normal mode may transmit a signal instructing the transition from the sleep mode to the normal mode to the second PHY layer 612-2 and the third PHY layer 612-3 via a P23 (e.g., the P23 illustrated in FIG. 3). When the signal instructing the transition from the sleep mode to the normal mode is received via a P13 (e.g., the P13 illustrated in FIG. 3), booting procedures for the second PHY layer 612-2 and the third PHY layer 612-3 may be performed, and the operation modes of the second PHY layer 612-2 and the third PHY layer 612-3 may transition from the sleep mode to the normal mode.

Also, the controller 611 may transmit the wake-up pattern obtained from the first PHY layer 612-1 to the second PHY layer 612-2 and the third PHY layer 612-3 through an MDIO interface (e.g., the P25 illustrated in FIG. 3) or an xMII (e.g., the P24 illustrated in FIG. 3). Each of the second PHY layer 612-2 and the third PHY layer 612-3 may receive the wake-up pattern from the controller 611, and identify the wake-up reason based on the received wake-up pattern. Then, each of the second PHY layer 612-2 and the third PHY layer 612-3 may generate a wake-up signal including the received wake-up pattern (S930), and transmit the generated wake-up signal (S940). Here, each of the second PHY layer 612-2 and the third PHY layer 612-3 may operate as a transmitting PHY layer, and the wake-up signal may be transmitted in a broadcast manner. The wake-up pattern included in the wake-up signal transmitted in the step S920 may be the same as the wake-up pattern included in the wake-up signal transmitted in the step S920.

The PHY layer 652 of the second end node 650 may receive the wake-up signal including the wake-up pattern from the first switch 610. The wake-up signal including the wake-up pattern may be stored in a PHY layer memory (e.g., the PHY layer memory 213 illustrated in FIG. 2) of the PHY layer 652. When the wake-up signal is received, the booting procedure for the PHY layer 652 may be performed, and the operation mode of the PHY layer 652 may transition from the sleep mode to the normal mode. The PHY layer 652 operating in the normal mode may transmit an interrupt signal to the controller 651 via a P11 (e.g., the P11 illustrated in FIG. 3), thereby causing the controller 651 to wake up. Alternatively, the PHY layer 652 operating in the normal mode may wake up the controller 651 by transmitting a HIGH signal to the OR gate so that power is supplied to the controller 651.

The PHY layer 652 may confirm the wake-up reason based on the wake-up pattern included in the wake-up signal. For example, when the received wake-up pattern is the wake-up pattern #0, the PHY layer 652 may determine that the wake-up reason is the door operation event. When the controller 651 operates in the normal mode, the PHY layer 652 may transmit the wake-up signal (or, the wake-up pattern included in the wake-up signal) received from the first switch 610 to the controller 651 through an MDIO interface (e.g., the P15 illustrated in FIG. 3) or an xMII (e.g., the P14 illustrated in FIG. 3).

On the other hand, when the interrupt signal is received from the PHY layer 652 or when power is supplied from the power circuit to the controller 651, a booting procedure for the controller 651 may be performed, and the operation mode of the controller 651 may transition from the sleep mode to the normal mode. The controller 651 operating in the normal mode may receive the wake-up signal (or, the wake-up pattern included in the wake-up signal) via the MDIO interface (e.g., the P25 shown in FIG. 3) or the xMII (e.g., the P24 illustrated in FIG. 3), and may identify the wake-up reason (e.g., one of the wake-up reasons in Table 1) based on the received wake-up pattern.

For example, when the received wake-up pattern is the wake-up pattern #0, the controller 651 may determine that the wake-up reason is the door operation event. When the second end node 650 performs an operation corresponding to the door operation event, the second end node 650 may maintain the normal mode, and perform an operation corresponding to the door operation event. On the other hand, when the second end node 650 does not perform an operation corresponding to the door operation event, the operation mode of the second end node 650 may transition from the normal mode to the sleep mode again.

Meanwhile, the first PHY layer 622-1 of the second switch 620 may receive the wake-up signal including the wake-up pattern from the first switch 610. Here, the first PHY layer 622-1 may operate as a receiving PHY layer. The wake-up signal including the wake-up pattern may be stored in a memory (e.g., the PHY layer memory 213 illustrated in FIG. 2) of the first PHY layer 622-1. When the wake-up signal is received, the booting procedure for the first PHY layer 622-1 may be performed, and the operation mode of the first PHY layer 622-1 may transition from the sleep mode to the normal mode. The first PHY layer 622-1 operating in the normal mode may transmit an interrupt signal to the controller 621 via a P11 (e.g., the P11 illustrated in FIG. 3), thereby causing the controller 621 to wake up. Alternatively, the first PHY layer 622-1 operating in the normal mode may wake up the controller 621 by transmitting a HIGH signal to the OR gate so that power is supplied to the controller 621.

The first PHY layer 622-1 may confirm the wake-up reason based on the wake-up pattern included in the wake-up signal. For example, when the received wake-up pattern is the wake-up pattern #0, the first PHY layer 622-1 may determine that the wake-up reason is the door operation event. When the controller 621 operates in the normal mode, the first PHY layer 622-1 may transmit the wake-up signal (or, the wake-up pattern included in the wake-up signal) received from the first switch 610 to the controller 621 through an MDIO interface (e.g., the P15 illustrated in FIG. 3) or an xMII (e.g., the P14 illustrated in FIG. 3).

On the other hand, when the interrupt signal is received from the first PHY layer 622-1 or when power is supplied from the power circuit to the controller 621, a booting procedure for the controller 621 may be performed, and the operation mode of the controller 621 may transition from the sleep mode to the normal mode. The controller 621 operating in the normal mode may receive the wake-up signal (or, the wake-up pattern included in the wake-up signal) via the MDIO interface (e.g., the P25 shown in FIG. 3) or the xMII (e.g., the P24 illustrated in FIG. 3). The wake-up signal (or, the wake-up pattern included the wake-up signal) may be stored in a memory of the controller 621 (e.g., the main memory 223 or the auxiliary memory 224 of FIG. 2).

The controller 621 operating in the normal mode may transmit a signal instructing the transition from the sleep mode to the normal mode to the second PHY layer 622-2 and the third PHY layer 622-3 via a P23 (e.g., the P23 illustrated in FIG. 3). When the signal instructing the transition from the sleep mode to the normal mode is received via a P13 (e.g., the P13 illustrated in FIG. 3), booting procedures for the second PHY layer 622-2 and the third PHY layer 622-3 may be performed, and the operation modes of the second PHY layer 622-2 and the third PHY layer 622-3 may transition from the sleep mode to the normal mode.

Also, the controller 621 may transmit the wake-up pattern obtained from the first PHY layer 622-1 to the second PHY layer 622-2 and the third PHY layer 622-3 through an MDIO interface (e.g., the P25 illustrated in FIG. 3) or an xMII (e.g., the P24 illustrated in FIG. 3). Each of the second PHY layer 622-2 and the third PHY layer 622-3 may receive the wake-up pattern from the controller 621, and identify the wake-up reason based on the received wake-up pattern. Then, each of the second PHY layer 622-2 and the third PHY layer 622-3 may generate a wake-up signal including the received wake-up pattern (S950), and transmit the generated wake-up signal (S960). Here, each of the second PHY layer 622-2 and the third PHY layer 622-3 may operate as a transmitting PHY layer, and the wake-up signal may be transmitted in a broadcast manner. The wake-up pattern included in the wake-up signal transmitted in the step S960 may be the same as the wake-up pattern included in the wake-up signal transmitted in the step S920.

The PHY layer 662 of the third end node 660 may receive the wake-up signal including the wake-up pattern from the second switch 620. The wake-up signal including the wake-up pattern may be stored in a memory (e.g., the PHY layer memory 213 illustrated in FIG. 2) of the PHY layer 662. When the wake-up signal is received, the booting procedure for the PHY layer 662 may be performed, and the operation mode of the PHY layer 662 may transition from the sleep mode to the normal mode. The PHY layer 662 operating in the normal mode may transmit an interrupt signal to the controller 661 via a P11 (e.g., the P11 illustrated in FIG. 3), thereby causing the controller 661 to wake up. Alternatively, the PHY layer 662 operating in the normal mode may wake up the controller 661 by transmitting a HIGH signal to the OR gate so that power is supplied to the controller 661.

The PHY layer 662 may confirm the wake-up reason based on the wake-up pattern included in the wake-up signal. For example, when the received wake-up pattern is the wake-up pattern #0, the PHY layer 662 may determine that the wake-up reason is the door operation event. When the controller 661 operates in the normal mode, the PHY layer 662 may transmit the wake-up signal (or, the wake-up pattern included in the wake-up signal) received from the second switch 620 to the controller 661 through an MDIO interface (e.g., the P15 illustrated in FIG. 3) or an xMII (e.g., the P14 illustrated in FIG. 3).

On the other hand, when the interrupt signal is received from the PHY layer 662 or when power is supplied from the power circuit to the controller 661, a booting procedure for the controller 661 may be performed, and the operation mode of the controller 661 may transition from the sleep mode to the normal mode. The controller 661 operating in the normal mode may receive the wake-up signal (or, the wake-up pattern included in the wake-up signal) via the MDIO interface (e.g., the P25 shown in FIG. 3) or the xMII (e.g., the P24 illustrated in FIG. 3), and may identify the wake-up reason (e.g., one of the wake-up reasons in Table 1) based on the received wake-up pattern.

For example, when the received wake-up pattern is the wake-up pattern #0, the controller 661 may determine that the wake-up reason is the door operation event. When the third end node 660 performs an operation corresponding to the door operation event, the third end node 660 may maintain the normal mode, and perform an operation corresponding to the door operation event. On the other hand, when the third end node 660 does not perform an operation corresponding to the door operation event, the operation mode of the third end node 660 may transition from the normal mode to the sleep mode again.

Meanwhile, the first PHY layer 632-1 of the third switch 630 may receive the wake-up signal including the wake-up pattern from the second switch 620. Here, the first PHY layer 632-1 may operate as a receiving PHY layer. The wake-up signal including the wake-up pattern may be stored in a memory (e.g., the PHY layer memory 213 illustrated in FIG. 2) of the first PHY layer 632-1. When the wake-up signal is received, the booting procedure for the first PHY layer 632-1 may be performed, and the operation mode of the first PHY layer 632-1 may transition from the sleep mode to the normal mode. The first PHY layer 632-1 operating in the normal mode may transmit an interrupt signal to the controller 631 via a P11 (e.g., the P11 illustrated in FIG. 3), thereby causing the controller 631 to wake up. Alternatively, the first PHY layer 632-1 operating in the normal mode may wake up the controller 631 by transmitting a HIGH signal to the OR gate so that power is supplied to the controller 631.

The first PHY layer 632-1 may confirm the wake-up reason based on the wake-up pattern included in the wake-up signal. For example, when the received wake-up pattern is the wake-up pattern #0, the first PHY layer 632-1 may determine that the wake-up reason is the door operation event. When the controller 631 operates in the normal mode, the first PHY layer 632-1 may transmit the wake-up signal (or, the wake-up pattern included in the wake-up signal) received from the second switch 620 to the controller 631 through an MDIO interface (e.g., the P15 illustrated in FIG. 3) or an xMII (e.g., the P14 illustrated in FIG. 3).

On the other hand, when the interrupt signal is received from the first PHY layer 632-1 or when power is supplied from the power circuit to the controller 631, a booting procedure for the controller 631 may be performed, and the operation mode of the controller 631 may transition from the sleep mode to the normal mode. The controller 631 operating in the normal mode may receive the wake-up signal (or, the wake-up pattern included in the wake-up signal) via the MDIO interface (e.g., the P25 shown in FIG. 3) or the xMII (e.g., the P24 illustrated in FIG. 3). The wake-up signal (or, the wake-up pattern included the wake-up signal) may be stored in a memory of the controller 631 (e.g., the main memory 223 or the auxiliary memory 224 of FIG. 2).

The controller 631 operating in the normal mode may transmit a signal instructing the transition from the sleep mode to the normal mode to the second PHY layer 632-2 via a P23 (e.g., the P23 illustrated in FIG. 3). When the signal instructing the transition from the sleep mode to the normal mode is received via a P13 (e.g., the P13 illustrated in FIG. 3), the booting procedure for the second PHY layer 632-2 may be performed, and the operation mode of the second PHY layer 632-2 may transition from the sleep mode to the normal mode.

The second PHY layer 632-2 may receive the wake-up pattern from the controller 631, and identify the wake-up reason based on the received wake-up pattern. Then, the second PHY layer 632-2 may generate a wake-up signal including the received wake-up pattern (S970), and transmit the generated wake-up signal (S980). Here, the second PHY layer 632-2 may operate as a transmitting PHY layer, and the wake-up signal may be transmitted in a broadcast manner. The wake-up pattern included in the wake-up signal transmitted in the step S980 may be the same as the wake-up pattern included in the wake-up signal transmitted in the step S920.

The PHY layer 672 of the fourth end node 670 may receive the wake-up signal including the wake-up pattern from the third switch 630. The wake-up signal including the wake-up pattern may be stored in a PHY layer memory (e.g., the PHY layer memory 213 illustrated in FIG. 2) of the PHY layer 672. When the wake-up signal is received, the booting procedure for the PHY layer 672 may be performed, and the operation mode of the PHY layer 672 may transition from the sleep mode to the normal mode. The PHY layer 672 operating in the normal mode may transmit an interrupt signal to the controller 671 via a P11 (e.g., the P11 illustrated in FIG. 3), thereby causing the controller 671 to wake up. Alternatively, the PHY layer 672 operating in the normal mode may wake up the controller 671 by transmitting a HIGH signal to the OR gate so that power is supplied to the controller 671.

The PHY layer 672 may confirm the wake-up reason based on the wake-up pattern included in the wake-up signal. For example, when the received wake-up pattern is the wake-up pattern #0, the PHY layer 672 may determine that the wake-up reason is the door operation event. When the controller 671 operates in the normal mode, the PHY layer 672 may transmit the wake-up signal (or, the wake-up pattern included in the wake-up signal) received from the third switch 630 to the controller 671 through an MDIO interface (e.g., the P15 illustrated in FIG. 3) or an xMII (e.g., the P14 illustrated in FIG. 3).

On the other hand, when the interrupt signal is received from the PHY layer 672 or when power is supplied from the power circuit to the controller 671, a booting procedure for the controller 671 may be performed, and the operation mode of the controller 671 may transition from the sleep mode to the normal mode. The controller 671 operating in the normal mode may receive the wake-up signal (or, the wake-up pattern included in the wake-up signal) via the MDIO interface (e.g., the P25 shown in FIG. 3) or the xMII (e.g., the P24 illustrated in FIG. 3), and may identify the wake-up reason (e.g., one of the wake-up reasons in Table 1) based on the received wake-up pattern.

For example, when the received wake-up pattern is the wake-up pattern #0, the controller 671 may determine that the wake-up reason is the door operation event. When the fourth end node 670 performs an operation corresponding to the door operation event, the fourth end node 670 may maintain the normal mode, and perform an operation corresponding to the door operation event. On the other hand, when the fourth end node 670 does not perform an operation corresponding to the door operation event, the operation mode of the fourth end node 670 may transition from the normal mode to the sleep mode again.

The control logic according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure. It is to be understood that the disclosure is not limited to the disclosed embodiments, but, on the contrary, is intended to cover various modifications and equivalent arrangements included within the spirit and scope of the appended claims.

What is claimed is:

1. A first communication node in a vehicle network, the first communication node comprising:
   a controller configured to detect a local event, transition an operation mode of a PHY layer from a sleep mode to a normal mode when the local event is detected, and generate a wake-up pattern corresponding to the local event, and
   the PHY layer configured to generate a wake-up signal including the wake-up pattern, and transmit the wake-up signal to a second communication node,
   wherein the wake-up signal wakes a PHY layer of the second communication node which uses the wake-up pattern included in the wake-up signal to confirm whether or not to maintain an operation mode of the second communication node based on the wake-up pattern,
   wherein the wake-up pattern includes at least one reason for transition to the normal mode, and
   wherein the confirmation of whether or not to maintain an operation mode of the second communication node includes:
      maintaining the operation mode as the sleep mode when an operation corresponding to the wake-up pattern is not to be performed by the second communication node; and
      transitioning the operation mode from the sleep mode to the normal mode when the operation corresponding to the wake-up pattern is to be performed by the second communication node.

2. The first communication node according to claim 1, wherein the local event indicates at the least one wake-up reason of the first communication node, and the wake-up pattern is configured for each of the at least one wake-up reason.

3. The first communication node according to claim 2, wherein the at least one wake-up reason includes at least one of: a door operation, a telematics operation, a media operation, a power mode transition of a vehicle, a theft detection, and a reserved operation.

4. The first communication node according to claim 1, wherein, when the first communication node is an end node in the vehicle network, the wake-up signal is transmitted in a broadcast manner to at least one switch connected to the first communication node.

5. A first communication node in a vehicle network, the first communication node comprising:
   a first physical (PHY) layer configured to receive a first wake-up signal including a wake-up pattern indicating at least one wake-up reason; and transition an operation mode of a controller from a sleep mode to a normal mode when the first wake-up signal is received;
   the controller configure to transmit the wake-up pattern to a second PHY layer; and
   the second PHY layer configured to generate a second wake-up signal including the wake-up pattern, and transmit the second wake-up signal to a second communication node,
   wherein the second wake-up signal wakes a PHY layer of the second communication node which uses the wake-up pattern included in the second wake-up signal to confirm whether or not to maintain an operation mode of the second communication node based on the wake-up pattern including the at least one reasons for transition to the normal mode, and
   wherein the confirmation of whether or not to maintain an operation mode of the second communication node includes:
      maintaining the operation mode as the sleep mode when an operation corresponding to the wake-up pattern is not to be performed by the second communication node; and
      transitioning the operation mode from the sleep mode to the normal mode when the operation corresponding to the wake-up pattern is to be performed by the second communication node.

6. The first communication node according to claim 5, wherein the wake-up pattern indicates the at least one wake-up reason of the second communication node, and the wake-up pattern is configured for each of the at least one wake-up reason.

7. The first communication node according to claim 5, wherein the at least one wake-up reason includes at least one of: a door operation, a telematics operation, a media operation, a power mode transition of a vehicle, a theft detection, and a reserved operation.

8. The first communication node according to claim 5, wherein, when the first communication node is a switch and the second communication node is an end node connected to the switch in the vehicle network, the second wake-up signal is transmitted in a broadcast manner to at least one other communication node connected to the switch.

9. The first communication node according to claim 5, wherein the second wake-up signal is configured to be identical to the first wake-up signal, and the second wake-up signal is transmitted by the second PHY layer.

10. A first communication node in a vehicle network, the first communication node comprising a controller and a physical (PHY) layer, wherein the PHY layer is configured to:
  receive a wake-up signal from a second communication node, the wake-up signal being configured to wake the PHY layer;
  identify a wake-up reason indicated by a wake-up pattern included in the wake-up signal; and
  confirm whether or not to maintain an operation mode of the first communication node based on the wake-up reason,
  wherein the confirmation of whether or not to maintain an operation mode of the first communication node includes:
    maintaining the operation mode as a sleep mode when an operation corresponding to the wake-up pattern is not to be performed by the first communication node; and
    transitioning the operation mode from the sleep mode to a normal mode when the operation corresponding to the wake-up pattern is to be performed by the first communication node.

11. The first communication node according to claim 10, wherein the wake-up signal is transmitted from the second communication node to the first communication node when a local event corresponding to the wake-up reason is detected by the second communication node.

12. The first communication node according to claim 10, wherein the wake-up reason includes at least one of: a door operation, a telematics operation, a media operation, a power mode transition of a vehicle, a theft detection, and a reserved operation.

13. The first communication node according to claim 10, wherein, when the first communication node is an end node in the vehicle network, the wake-up signal is transmitted in a broadcast manner to at least one switch connected to the first communication node.

* * * * *